Aug. 21, 1951 A. J. ZAK 2,565,290
THERMOSTATICALLY CONTROLLED MIXING VALVE
Filed Feb. 6, 1950
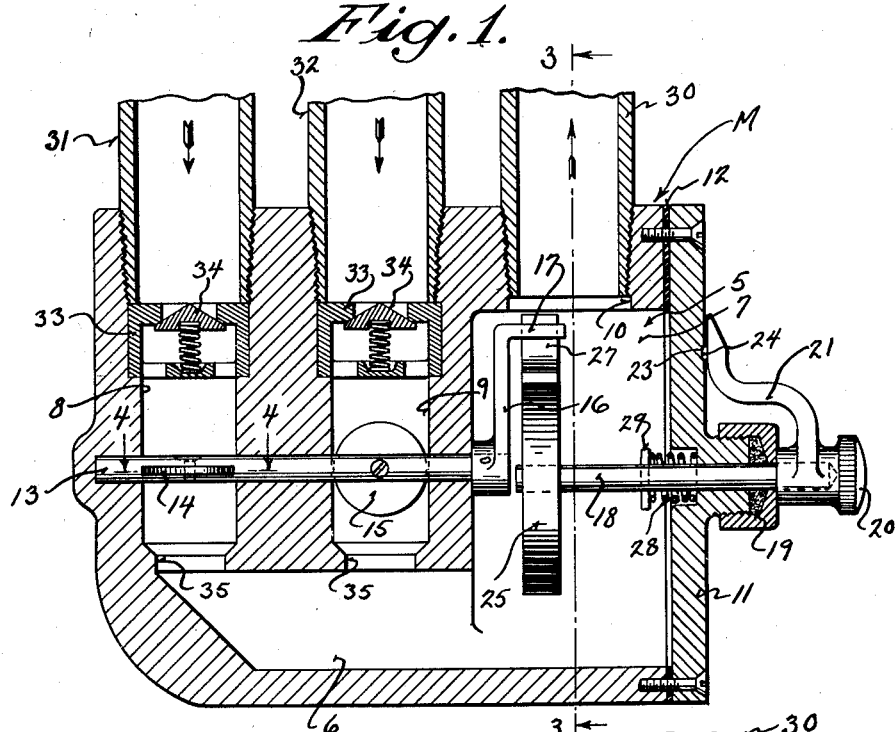
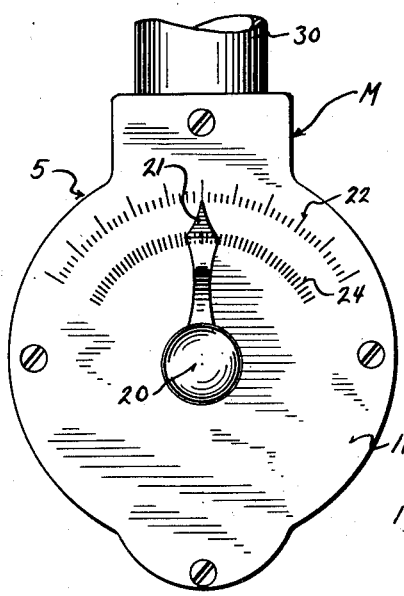
INVENTOR
ALPHONSE J. ZAK
BY
ATTORNEYS Patented Aug. 21, 1951

2,565,290

UNITED STATES PATENT OFFICE 2,565,290

THERMOSTATICALLY CONTROLLED MIXING VALVE

Alphonse J. Zak, Milwaukee, Wis.

Application February 6, 1950, Serial No. 142,590

1 Claim. (Cl. 236—12)

This invention appertains to a thermostatically controlled hot and cold water mixing valve, and more particularly to a novel means for constructing said valve to obtain a positive operation thereof.

One of the primary objects of my invention is to provide a hot and cold water or other liquid mixing valve which will be durable and efficient in use, one that will be simple to manufacture, one which can be placed upon the market at a reasonable price and one which will be of an exceptional compact nature so as to occupy a minimum amount of space in a wall or the like.

Another salient object of my invention is to provide a valve casing embodying spaced parallel hot and cold water inlets, with a single valve shaft extending through the inlets having secured directly thereto for movement therewith butterfly valves for the hot and cold water inlets, whereby any movement of the shaft directly affects the position of the butterfly valves.

A further important object of the invention is the provision of a manually adjustable control shaft disposed in front of and parallel with the valve shaft, with a spiral bimetallic spring (thermostat) connecting said shafts together, said thermostat being located adjacent to the outlet for the mixed hot and cold water, and in the path of the flow of said mixed water to the outlet.

A still further object of the invention is the provision of novel means in the valve casing for preventing back pressure in the hot and cold water conduit pipes, and to reduce back pressure on the butterfly valves, so as to insure ease and positive operation of the valve shaft and butterfly valves.

A still further object of the invention is the provision of means for holding the manually operable shaft in a selected temperature controlling position against accidental movement and against movement under influence of the thermostat.

With these and other objects in view, the invention consists in the novel construction, arrangement and formation of parts, as will be hereinafter more specifically described and claimed and illustrated in the accompanying drawing, in which drawing:

Figure 1 is a longitudinal sectional view through my improved hot and cold liquid mixing valve.

Figure 2 is a front elevational view of the hot and cold water mixing valve.

Figure 3 is a transverse sectional view through the mixing valve taken on the line 3, 3 of Figure 1, looking in the direction of the arrows.

Figure 4 is a fragmentary detail horizontal sectional view taken on the line 4, 4 of Figure 1, looking in the direction of the arrows and illustrating one of the butterfly valves.

Referring to the drawing in detail, wherein similar reference characters designate corresponding parts throughout the several views, the letter M generally indicates my novel mixing valve, and the same includes a valve casing 5 which can be of a general cylindrical form in cross section. The valve casing is provided with a longitudinal way 6 for the passage of hot and cold water, and communicating with this passageway adjacent to the front of the casing is a mixing chamber 7. Communicating with the passageway 6 at one side of the chamber 7 are the spaced parallel cold and hot water inlets 8 and 9. Communicating with the chamber 7 is the mixed hot and cold water outlet 10, and it is to be noted that the inlets 8 and 9 and the outlet 10 are arranged in spaced parallel relation, but obviously, a different angle for the outlet 10 can be had if such should be desired. The front of the casing 5 is preferably left open for ease in assembling various parts, and the front of the casing is normally closed by a front plate 11 which can be of an ornamental character. Obviously, a gasket or other packing 12 can be placed between the front plate 11 and the body of the casing 5.

Extending through the inlets 8 and 9 is a rotatable valve shaft 13, and this valve shaft extends diametrically through the inlets and is supported by certain walls of the casing for free turning movement.

Rigidly secured to the shaft 13 for turning movement therewith are butterfly valves 14 and 15. The valve 14 controls the flow of cold water through the inlet 8 and the valve 15 controls the flow of hot water through the inlet 9, and these valves are preferably at right angles to one another. The forward end of the shaft 13 extends into the chamber 7 and has secured thereto the crank arm 16. The outer end of the arm terminates in a slotted right angularly extending leg 17 for a purpose which will be later set forth.

Rotatably carried by the front cover plate 11 is the manually controlled adjustment shaft 18, and this shaft can be disposed just off center from the shaft 13, and the adjustment shaft 18 terminates in close proximity to the front end of the shaft 13 and the crank arm 16. A packing gland 19 can be provided for the shaft 18 to prevent leakage of water around the same. The outer end of the shaft 18 carries a manipulating hand knob 20, which is also, preferably, of an ornamental character. Formed on the knob 20 is an indicating pointer 21, for travelling movement over the front face of the cover plate 11, and a scale 22 marked thereon. The pointer 21 can also carry a latch tooth 23. This tooth travels over a series of indentations 24, and the tooth engaging the walls of the indentation prevent accidental rotation of the adjustment shaft 18.

A spiral bimetallic spring 25 (thermostat) connects the shafts 18 and 13 together, and the inner end of the spring 25 is firmly anchored to the shaft 18, as at 26. The outer end of the spring terminates in a finger 27, and this finger is connected to the leg 17 of the crank arm 16. In order to maintain the pointer 21 in proper position, a spring 28 can be coiled around the shaft 18, and one end of the spring can bear against the plate 11 and the other end of the spring against the pin 29 or washer carried by said shaft.

By referring to Figure 1, it can be seen that the thermostat 25 is disposed directly within the mixing chamber 7 and in close proximity to the outlet 10, and, consequently, the mixed water from the inlets 8 and 9 flow directly past the thermostat to the outlet, and the temperature of the mixed water will directly affect the thermostat. The thermostat 25 is arranged to maintain the temperature value of the mixed water constant. If the temperature of the water drops, the spiral will contract and rotate the crank arm 16 and shaft 13 in a direction tending to open butterfly valve 15 and to close butterfly valve 14. If the temperature of the water increases, a reverse action occurs, and the spiral will expand and will turn the shaft 13 and move the valve 15 toward a closed position, and the valve 14 toward an open position. By turning the knob 20, the position of the shaft 18 can be changed so as to alter the position of the inner convolutions of the thermostat, and hence, by setting the knob at a selected point, a certain temperature of water can be had. Obviously, a mixed water conduit pipe 30 communicates with the outlet 10 and a cold water conduit pipe 31 communicates with the inlet 8, likewise, a hot water conduit pipe 32 communicates with the inlet 9.

In order to prevent back pressure of water through the pipes 31 and 32, and to relieve undue pressure on the valves 14 and 15, I prefer to provide the following construction:

Valve cages 33 are disposed in the inlets 8 and 9 on the inlet side of the valves, and these cages 33 carry spring pressed one-way check valve bodies 34. Obviously, water flowing through the conduits 31 and 32 into the valve casing will unseat the check valve bodies, but that water tending to flow in the reversed direction will seat said valve bodies. The inlets 8 and 9 are slightly restricted, as at 35, below the valves 14 and 15, and this restriction also lessens back pressure on the valves 14 and 15.

While I have illustrated a hand knob 20, it is to be understood that a remote control device can be employed for adjusting the shaft 18.

Changes in details may be made without departing from the spirit or the scope of this invention, but what I claim as new is:

A thermostatically controlled water mixing valve comprising a housing having a longitudinal passageway and spaced parallel inlets communicating with the passageway for cold and hot water, said casing also having a mixing chamber for hot and cold water communicating with the longitudinal passage and an outlet communicating with the chamber for mixed hot and cold water, a rotatable valve shaft in said casing extending diametrically through the inlets, a butterfly valve for each inlet secured directly to the valve shaft for turning movement therewith, a crank arm on the valve shaft disposed in the chamber, an adjustment shaft rotatably carried by the casing disposed in front of the valve shaft and having its forward end extending beyond said casing, a handle for turning the shaft, and a thermostat, including a spiral bimetallic spring, having its inner end connected to the adjustment shaft and its outer end connected to the crank arm.

ALPHONSE J. ZAK.

REFERENCES CITED

The following references are of record in the file of this patent:

UNITED STATES PATENTS

| Number | Name | Date |
|---|---|---|
| 1,224,614 | Dougan | May 1, 1917 |
| 1,819,045 | Snediker | Aug. 18, 1931 |
| 2,349,051 | Novak | May 16, 1944 |
| 2,463,640 | Plett | Mar. 8, 1949 |

FOREIGN PATENTS

| Number | Country | Date |
|---|---|---|
| 594,608 | France | June 27, 1925 |